United States Patent [19]
Robinson

[11] 3,833,093
[45] Sept. 3, 1974

[54] CYCLIC ENERGY ABSORBER

[75] Inventor: William Henry Robinson, Eastbourne, New Zealand

[73] Assignee: New Zealand Inventions Development Authority, Wellington, New Zealand

[22] Filed: Dec. 21, 1972

[21] Appl. No.: 317,431

[30] Foreign Application Priority Data
Dec. 22, 1971 New Zealand .................. 165897

[52] U.S. Cl. .................. 188/1 C, 74/492, 293/70
[51] Int. Cl. .................................. F16f 7/12
[58] Field of Search .......... 74/492; 188/1 C; 293/70

[56] References Cited
UNITED STATES PATENTS

| | | | |
|---|---|---|---|
| 2,971,566 | 2/1961 | Negroni | 188/1 C X |
| 3,209,864 | 10/1965 | Boyd | 188/1 C |
| 3,298,465 | 1/1967 | Stastny | 188/1 C |
| 3,721,320 | 3/1973 | Hirsch | 188/1 C |

FOREIGN PATENTS OR APPLICATIONS
1,105,404  6/1955  France .................. 188/1 C Primary Examiner—Duane A. Reger
Attorney, Agent, or Firm—Holman & Stern

[57] ABSTRACT

An energy absorber for incorporation in bridges or buildings which must withstand earthquakes or other vibratory forces. It has two concentric members which in action move longitudinally relative to each other as the structure vibrates. At one point of its length one of the members is shaped such that the annular space between the members forms an orifice. The space between the members is filled with lead. The forcing of the lead through the orifice absorbs energy, while the subsequent recovery and recrystallization returns the material nearly to its original state.

9 Claims, 3 Drawing Figures

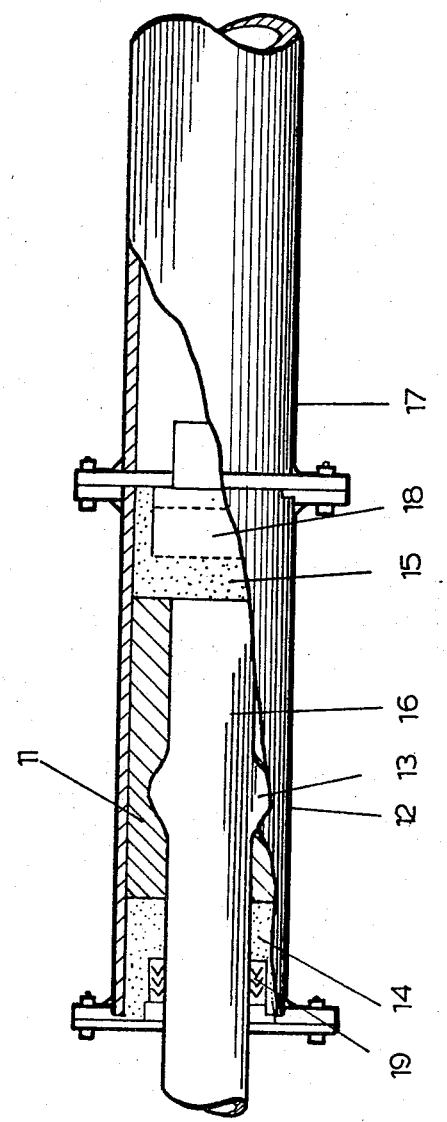

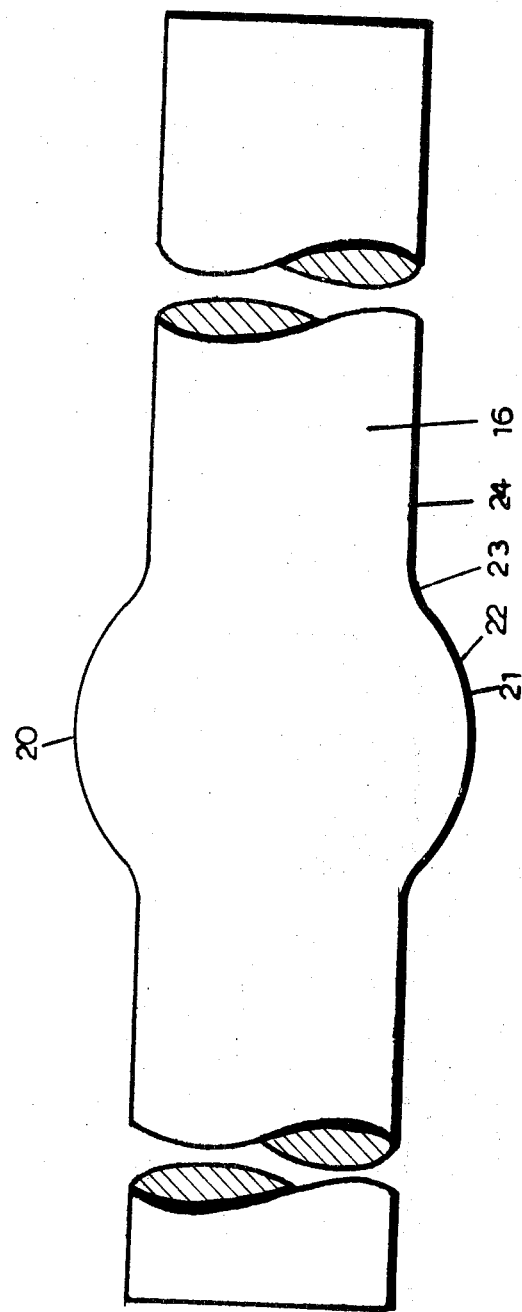

CYCLIC ENERGY ABSORBER

BACKGROUND OF THE INVENTION

1. Field of the Invention

This invention relates to an energy absorber. In particular it relates to a cyclic energy absorber. In particular it relates to an absorber in which lead is forced through an aperture and subsequently recrystallizes.

2. Description of the Prior Art

Energy absorbers, otherwise known as shock absorbers or dampers, are well known. There are many designs which will markedly reduce the energy, whether impact or cyclic, transmitted by forces of a few tens of newtons. There are, however, applications in which forces several orders greater than this may cause damage. As one example only, we may consider the effect of a major earthquake on a structure such as a building or a bridge. Forces now involved are tens of thousands of newtons, and it is well known that they may cause heavy damage to the structure.

It is standard practice so to design structures that the energy transmitted to the building by such a natural phenomenon as an earthquake (high winds can also cause damage) is absorbed within the building by additional material which costs a considerable amount of money and is redundant from statical considerations.

In the attempt to reduce this extra expense, attempts have been made to prevent the transmission to the building of earthquake forces by mounting the building on rubber or by incorporating in it special panels, commonly of reinforced concrete, which are designed to be energy absorbers. It is not known how effective the rubber damper is. It is known that the special concrete panels are expensive, and that they will be destroyed in one or a few severe earthquakes and will have to be replaced at appreciable expense.

Thus it is clear that the prevention of damage in structures by absorbing the energy imparted by earthquakes by processes that do not involve damage to the structure has attracted expert attention. Although this has been the subject of much research and development in this country and abroad there remains room in this technology for the development of more satisfactory devices.

SUMMARY OF THE INVENTION

Accordingly the purpose of this invention is to reduce the cost and improve the safety of structures such as buildings in regions liable to earthquakes by providing a design for a compact and inexpensive device which will absorb large amounts of energy when the structure is vibrated. The invention resides in new cyclic energy absorbers and methods of construction thereof, in particular, an absorber in which the absorbing element is lead, contained between two concentric elements which include an orifice through which the lead is forced to pass in each half cycle of vibration of the structure. The lead absorbs energy on being deformed as it passes through the orifice. Some of this energy appears immediately as heat while the remainder is stored in the deformed crystal structure and is subsequently converted into heat during the process of recovery and recrystallization.

BRIEF DESCRIPTION OF THE DRAWINGS

FIG. 2 shows a cross section of a second embodiment of the invention.

FIG. 3 shows in more detail the shape of the bulge on the rod of FIG. 2.

DESCRIPTION OF PREFERRED EMBODIMENT

Figure 1:
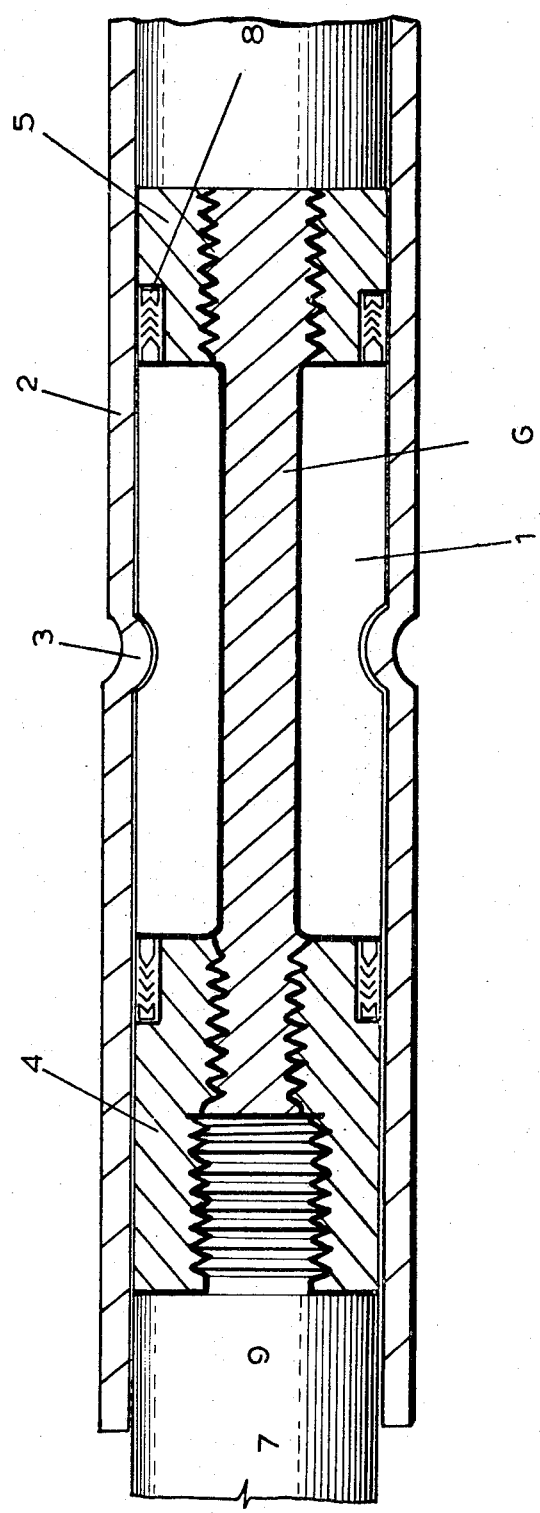
FIG. 1 shows a cross section of a first embodiment of the invention.

This energy absorber is an extruder in which extruded material passes back and forth relative to an orifice. In general, extrusion of a crystalline material produces a severe plastic deformation, in which the original relatively perfect grains (or crystals) become elongated with a highly distorted lattice structure. This process may or may not be reversible.

The successful operation of the energy absorber rests on one or more of three inter-related processes — recovery, recrystallization and grain growth. When crystalline materials plastically deform a proportion of the energy expended in the process appears immediately as heat, but some is stored in the deformed structure. This stored energy acts as the driving-force which tends to return the material to the undeformed state with the release of heat, provided the material is at a temperature where the required reaction — recovery, recrystallization and/or grain growth — can occur at a useful rate. A cyclic extrusion energy absorber requires an extrudable material in which one or more of these processes takes place spontaneously and quickly at the operating temperature of the device so that the mechanical properties of the material are essentially the same over each cycle.

In the embodiments described below the extrudable material is lead which has a time constant, depending on conditions, of between 1 and 10 seconds for complete recovery of its original mechanical properties.

The greater the rate at which the lead is deformed the faster it will recrystallize. The effect of an increase in temperature is two fold, a. as the temperature increases the flow stress decreases and therefore the energy absorbed decreases, b. the higher the temperature the more rapidly the lead will recover and recrystallize.

These facts mean that the extrusion absorber is a stable device and is not readily able to destroy itself.

The embodiments to be described have been so designed that when they are used to absorb the energy of an earthquake (which has a periodicity of the order of seconds), the heating of the deformable material, in this case lead, will not be such as to cause melting however long the process is continued.

It is possible so to vary the design as to produce an embodiment in which the lead would melt after a number of cycles.

Both embodiments to be described have been designed to extract the energy from a force of 150 kN cyclically applied as in an earthquake. A smaller model according to a similar design withstood 3,400 cycles at approximately 2 Hz.

In FIG. 1 1 is a hollow cylinder of commercially pure lead contained within a steel tube 2. The bore of the tube is honed, and an orifice is produced by pressing in the wall of the tube at 3. The wall of the tube and all other surfaces on which the lead must slide are coated with a high pressure, high temperature grease such as Castrol BNS (Registered T.M.). Axially the lead is constrained by two plungers 4 and 5, held together by a high tensile steel tie rod 6. This rod is operationally continuous with rod 7 which applies the cyclic force, tube 2 being held stationary. Leakage past the plungers is prevented by hydraulic seals 8 and 9, such as the Chevron seals made by James Walker & Company Limited, Woking, England. Because the tie rod was of high tensile steel, and the rod 7, having a larger diameter, could be of mild steel, the two were assembled by being screwed respectively into the plunger 4. The apparatus was finally assembled by screwing plunger 5 into place.

Considering now the operation of the energy absorber of the instant invention as shown in FIG. 1, when an earthquake, for example, strikes a structure in which it may be employed, it induces oscillations which tend to shorten and lengthen cyclically the energy absorber. As it is shortened piston 4 forces the extrudable material to the left of the bulge 3 through the extrusion orifice formed by 3. In doing this, the material 1 is subjected to a severe plastic deformation in which the original relatively perfect grains (or crystals) become deformed. This absorbs energy, some of which appears immediately as heat, but some is stored in the deformed structure of the material. As this material is forced to the space to the right of the extrusion orifice, the stored energy acts as the driving force which tends to return the material to the undeformed state with the further release of heat, provided the material is at a temperature where the required reaction-recovery, recrystallisation, and/or grain growth can occur at a useful rate. This rate, for present purposes, is defined by the frequency of oscillation of the structure when exposed to an earthquake and this frequency is in the general neighborhood of one cycle per second. Materials such as lead have the useful property that at room temperatures the recovery reaction can take place within the limits of the time so set.

At the end of a first half cycle of vibration of the structure under earthquake stress, the length of the energy absorber will tend to increase and the material 1 is forced by piston 5 once more to pass through the orifice.

This oscillatory process is repeated for as long as the structure is subjected to major vibration by the earthquake. In general, this is for a number of tens of cycles.

The energy absorbed from the vibration of the structure will, of course, damp that vibration. The energy absorbed is released as heat and will tend to heat the absorber. As the temperature increases the flow stress of the material 1 will decrease and therefore the energy absorbed will decrease. This means that the device is stable and not subject to self-destruction. Secondly, when a material such as lead is the material 1, the higher the temperature it attains the more rapidly the recovery process will take place. This is the second property that makes for stability.

FIGS. 2 and 3 show an embodiment which is a development of the embodiment of FIG. 1 in that the orifice is formed by a bulb on the inner member corresponding to the tie rod instead of being produced by a swageing in the tube. As a result, assuming that in both cases the tube is held stationary and the inner rod is moved, in the first embodiment the lead is caused to flow through the orifice and in the second embodiment the orifice is caused to pass through the lead. The action of the absorber of FIG. 2 is essentially the same however, as that so far described with reference to the embodiment shown in FIG. 1.

In FIG. 2, 11 is a cylindrical plug of commercially pure lead contained within a tube 12 of hot finished seamless steel. Since the bore of the tube is to be uniform it need not be worked and its original smooth surface is preserved. Axially the lead is constrained by two bearings 14 and 15 with hydraulic seals 18 and 19. 16 is a mild steel rod reciprocating in bearings 14 and 15. 13 is a bulge turned on rod 16. Its contours are shown in FIG. 3. In the embodiment described tube 12 has an inside diameter of 3½ inches and the maximum diameter of the bulge is 2.65 inches giving a reduction of area of 43 percent. Over the bulge the maximum diameter is constant for an axial length of about one-fourth inch as shown at 20. The straight lines bounding this cylindrical portion in section are tangential to a 1 inch radius curve 21 which in turn is tangential to a conical portion 22. The semi-vertical angle of this cone must not exceed 30°. A further curve 23 leads into the 1¾ inches diameter 24 part of the shaft.

The wall of 16 and all other surfaces on which the lead must slide are coated with high pressure high temperature grease.

A part of shaft 16 which projects through bearing 15 is covered by protective tube 17. This serves also as a mounting member.

In designing an absorber according to this invention, it will be known what force is the maximum for which the device is to be used. This force and the area of the bore of the tube occupied by lead give the maximum internal pressure. From this the wall thickness of the tube can be determined using thick-walled tube theory.

Published tables related to extrusion show the relation between maximum internal pressure, otherwise known as "ram pressure," and the ratio of area of tube to area of constriction. Such tables can be found in the NEL Report No. 2 published by D.S.I.R. (U.K.) June 1961 — "The Effect of Ram Speed on the Extrusion of Lead and Aluminium" by K. Ashcroft and G. S. Lawson, and in "The Extrusion of Metals" by Claude E. Pearson, published by John Wiley & Sons, N.Y., 1944.

In the embodiment of FIG. 1 the internal diameter of the tube is 3.625 inches, and the thickness of the wall is 0.330 inches. The tie rod is 1.13 inches in diameter, and it is made from steel having a yield point at approximately 620 MN/m$^2$.

In the embodiment of FIG. 1 the minimum internal diameter at the orifice was 3.03 inches, giving a 30 per cent reduction.

The embodiment of FIGS. 2 and 3 is easier to make than the embodiment of FIG. 1 since it is easier to control the shape of the bulge, which must not have sudden discontinuities, when it is on the outside of a member to be shaped. The inner rod 16 is less heavily stressed than the tie rod 6 of FIG. 1, so special steels, and the carefully made joint for attaching 7 to 6 in FIG. 1, are not needed.

A suitable extrudable material is one which returns after each cycle of operation nearly to its original state. With different materials this occurs at different temperatures. The working temperature must be above the recrystallization temperature of the material and below its melting point. When the working temperature is between 0°C and 300°C lead is especially suitable. At higher temperatures aluminium, for example, can be used. There are low temperatures at which ice could be used, and metals, such as indium would be suitable at temperatures below 20°C.

What I claim is:

1. A cyclic energy absorber interposable between members of a structure which are caused by incoming energy to move cyclically relative to each other, said absorber comprising concentric elements separated by captive extrudable material and movable relative to each other during relative movements of the members, and means defining an extrusion orifice between the elements through which the extrudable material is cyclically forced during corresponding movements of said concentric elements, so absorbing energy without permanent structural breakdown of the extrudable material at the operating temperature of said absorber.

2. An absorber as claimed in claim 1 wherein the concentric elements are cylinders with a distortion at one point in the length to form an annular extrusion orifice.

3. An energy absorber as claimed in claim 1 wherein the extrudable material is a crystalline substance which at the operating temperature of said energy absorber, spontaneously recovers and recrystallises to regain its original mechanical properties so that the absorber exhibits the same characteristics on each cycle of its operation, without self-destruction.

4. An absorber as claimed in claim 3 wherein the extrudable material consists of lubricated lead.

5. A device for absorbing energy comprising:
cylinder means;
rod means disposed within said cylinder means and relatively movable therewith;
at least one pair of spaced sealing means annularly disposed between the adjacent movable surfaces of said rod means and said cylinder means, to form an annular sealed enclosure therebetween;
reducing means locatably positioned within said sealed enclosure at a predetermined point between said spaced sealing means to form an annular extrusion orifice therein;
a self-healing extrudable material disposed within said sealed enclosure whereby during cyclical relative movements of said rod means and said cylinder means the extrudable material is cyclically deformably forced through said extrusion orifice without destruction of its initial mechanical properties thus permitting cyclical absorption of energy by said device.

6. A device as claimed in claim 5 wherein said reducing means comprises a smooth swelling of said rod means at a point along its length within said sealed enclosure, and said sealing means are fixedly disposed relative to said cylinder means.

7. A device as claimed in claim 5 wherein said reducing means comprises a reduction in internal diameter of the cylinder, said rod means is fitted with pistons for propelling the extrudable material through said extrusion orifice, and said sealing means are fixedly disposed relative to said rod means.

8. An absorber as claimed in claim 5 wherein a tangent to the surface of said rod means is at an angle to the axis thereof which does not change abruptly.

9. A device as claimed in claim 5 wherein the extrudable material consists of lubricated lead.

* * * * *